United States Patent
Peyton et al.

(10) Patent No.: US 11,049,093 B2
(45) Date of Patent: Jun. 29, 2021

(54) USE OF MOBILE NETWORK OPERATOR DATA AND/OR SCORES IN DECISION-MAKING ON REQUESTS FOR PAYMENT CREDENTIAL PROVISIONING FOR MOBILE DEVICES

(71) Applicant: Mastercard International Incorporated, Purchase, NY (US)

(72) Inventors: Kimberly Lewis Peyton, New York, NY (US); Maurice David Liscia, Long Island City, NY (US); Sherri Haymond, Darien, CT (US)

(73) Assignee: Mastercard International Incorporated, Purchase, NY (US)

( * ) Notice: Subject to any disclaimer, the term of this patent is extended or adjusted under 35 U.S.C. 154(b) by 19 days.

(21) Appl. No.: 16/735,292

(22) Filed: Jan. 6, 2020

(65) Prior Publication Data

US 2020/0143357 A1 May 7, 2020

Related U.S. Application Data

(63) Continuation of application No. 14/878,438, filed on Oct. 8, 2015, now Pat. No. 10,540,648.

(60) Provisional application No. 62/147,926, filed on Apr. 15, 2015.

(51) Int. Cl.
  *G06Q 20/32* (2012.01)
  *G06Q 20/36* (2012.01)
  *G06Q 20/40* (2012.01)

(52) U.S. Cl.
  CPC ....... *G06Q 20/3255* (2013.01); *G06Q 20/325* (2013.01); *G06Q 20/36* (2013.01); *G06Q 20/401* (2013.01); *G06Q 20/4016* (2013.01)

(58) Field of Classification Search
  CPC .. G06Q 20/322; G06Q 20/32; G06Q 20/3227; G06Q 20/40; H04W 12/0023
  See application file for complete search history.

(56) References Cited

U.S. PATENT DOCUMENTS

| | | | |
|---|---|---|---|
| 2014/0046850 A1 | 2/2014 | Xiang et al. | |
| 2014/0101034 A1* | 4/2014 | Tanner | G06Q 20/322 705/39 |
| 2016/0078434 A1* | 3/2016 | Huxham | G06Q 20/382 705/71 |

FOREIGN PATENT DOCUMENTS

| | | |
|---|---|---|
| JP | 2001266034 A | 9/2001 |
| JP | 2002352036 A | 12/2002 |
| JP | 2009245208 A | 10/2009 |
| JP | 2014524622 A | 9/2014 |

OTHER PUBLICATIONS

"Japanese Office Action" drafted date Aug. 18, 2020, Japanese Patent Office (JPO), for Japanese Application No. 2019-189566, 5pgs.

(Continued)

*Primary Examiner* — Scott S Trotter
(74) *Attorney, Agent, or Firm* — Buckley, Maschoff & Talwakar LLC

(57) ABSTRACT

A method of provisioning payment credentials to a mobile device includes receiving a payment credentials provisioning request. The method further includes facilitating decision-making with respect to the request based at least in part on data obtained and/or confirmed directly or indirectly from a mobile network operator (MNO) associated with the mobile device.

20 Claims, 12 Drawing Sheets

(56) References Cited

OTHER PUBLICATIONS

"English-language Translation of Japanese Office Action" drafted date Aug. 18, 2020, Japanese Patent Office (JPO), for Japanese Application No. 2019-189566, 6pgs.
"Japanese Office Action" drafted date Feb. 24, 2021, Japanese Patent Office (JPO), for Japanese Application No. 2019-189566, 3 pp.
"English-language Translation of Japanese Office Action" drafted date Feb. 24, 2021, Japanese Patent Office (JPO), for Japanese Application No. 2019-189566, 4 pp.
"Brazilian Preliminary Office Action" dated Aug. 5, 2020, INPI, for Brazilian Application No. 112017022083-0, 4pgs.
"English-language Translation of Brazilian Preliminary Office Action" dated Aug. 5, 2020, Brazilian Application No. 112017022083-0, 1pg.

\* cited by examiner

USE OF MOBILE NETWORK OPERATOR DATA AND/OR SCORES IN DECISION-MAKING ON REQUESTS FOR PAYMENT CREDENTIAL PROVISIONING FOR MOBILE DEVICES

CROSS-REFERENCE TO RELATED APPLICATION

This application is a continuation of U.S. application Ser. No. 14/878,438 filed on Oct. 8, 2015, which claims the benefit of U.S. Provisional Patent Application No. 62/147,926 filed on Apr. 15, 2015, the contents of which applications are hereby incorporated by reference for all purposes.

BACKGROUND

One common manner of accessing payment accounts is by presenting a payment card at a point of sale in a retail store. On such occasions, payment credential information such as a payment account number (e.g., a PAN or "primary account number") or a proxy for such as number (e.g., a payment token), and related information, may be read from the payment card by a POS terminal.

It has been proposed that mobile devices such as smartphones be used at the point of sale in lieu of a conventional payment card. For such purposes, mobile devices may be equipped with appropriate hardware features, such as circuitry for short-range radio data communications with the POS terminal or a reader component thereof. In addition, to enable the mobile device to function as a payment device, one or more payment application programs ("apps") and one or more sets of payment credentials may be provisioned to the mobile device.

According to other proposals, payment credentials may be used for remote payments and may reside on a server. In addition or alternatively, payment details may be tokenized by using card-on-file tokens. In addition or alternatively, payment credentials for use by payment-enabled mobile devices may be stored in a remote server and made available for a transaction at the point of sale initiated by the payment-enabled mobile device.

The present inventors have now recognized opportunities to enhance the decision-making process that may be undertaken when a request is received to provision payment credentials to a mobile device.

BRIEF DESCRIPTION OF THE DRAWINGS

Features and advantages of some embodiments of the present disclosure, and the manner in which the same are accomplished, will become more readily apparent upon consideration of the following detailed description of the disclosure taken in conjunction with the accompanying drawings, which illustrate preferred and exemplary embodiments and which are not necessarily drawn to scale, wherein.

DETAILED DESCRIPTION

In general, and for the purpose of introducing concepts of embodiments of the present invention, information obtained directly or indirectly from an MNO (mobile network operator) may be used to supplement and/or guide decision-making processes that may take place when a request is received to provision payment credentials to a mobile device. The MNO information may make it possible to optimize the process and/or enhance the reliability or confidence level of decision-making outcomes when ID&V (user identification and verification) is performed in response to a provisioning request or when it is to be decided whether and/or what kind of ID&V is required. In some aspects, processes provided according to the teachings of this disclosure may obviate the need for ID&V processing.

Figure 1:
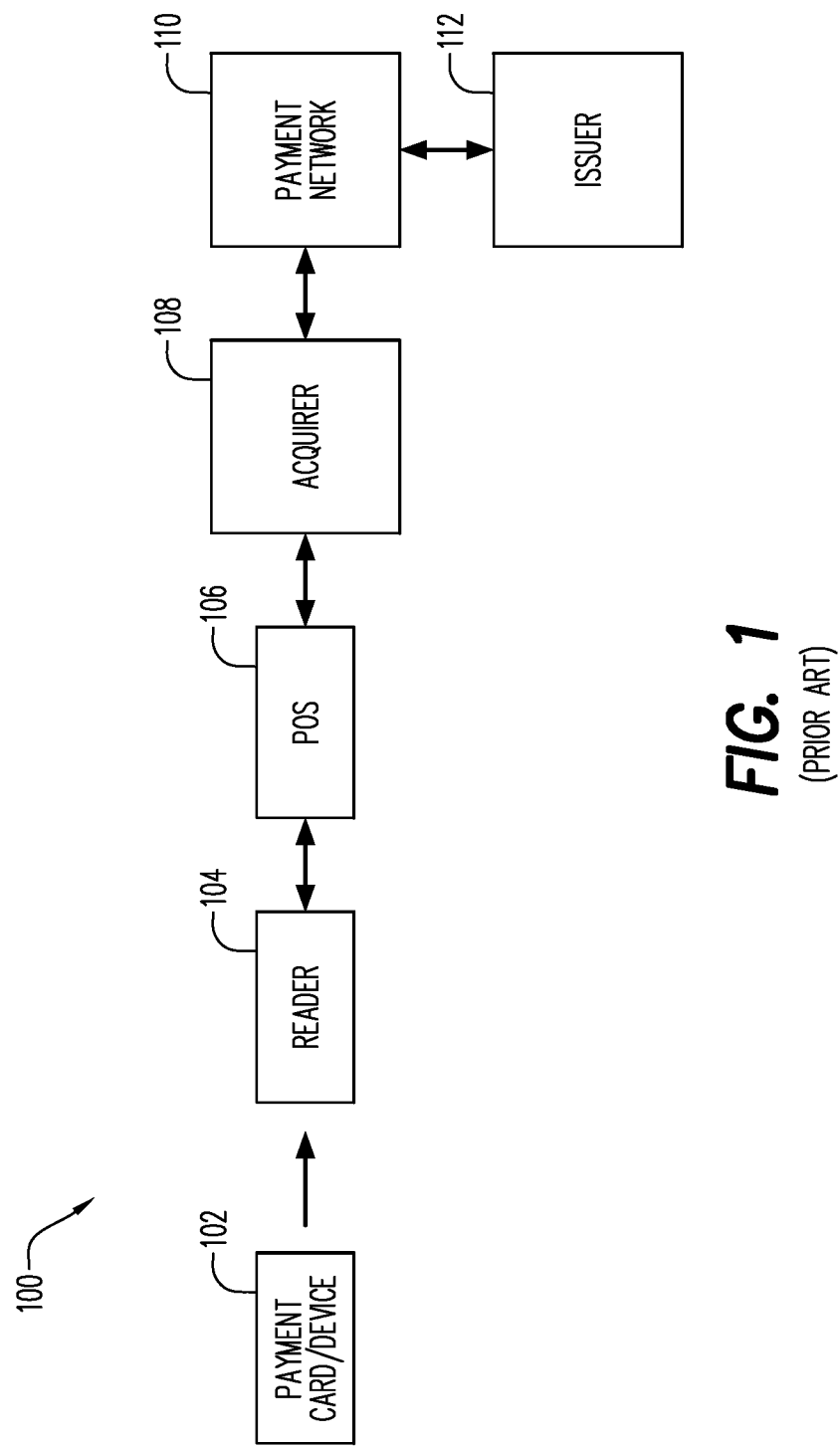
FIG. 1 is a block diagram representation of a conventional payment system.

FIG. 1 is a block diagram of a conventional payment system 100.

The system 100 includes a conventional payment card/device 102. With pertinence to the present disclosure, the payment device 102 may be a payment-enabled mobile device that stores credentials for a number of payment accounts and runs a wallet app, as well as one or more payment apps. The system 100 further includes a reader component 104 associated with a POS terminal 106. In some known manner (depending on the type of the payment device 102) the reader component 104 is capable of reading the payment account number and other information from the payment device 102.

The reader component 104 and the POS terminal 106 may be located at the premises of a retail store and operated by a sales associate of the retailer for the purpose of processing retail transactions.

A computer 108 operated by an acquirer (acquiring financial institution) is also shown as part of the system 100 in FIG. 1. The acquirer computer 108 may operate in a conventional manner to receive an authorization request for the transaction from the POS terminal 106. The acquirer computer 108 may route the authorization request via a payment network 110 to the server computer 112 operated by the issuer of a payment account that is associated with the payment card/device 102. As is also well known, the authorization response generated by the payment account issuer server computer 112 may be routed back to the POS terminal 106 via the payment network 110 and the acquirer computer 108.

One well known example of a payment network is referred to as the "Banknet" system, and is operated by MasterCard International Incorporated, which is the assignee hereof.

The payment account issuer server computer 112 may be operated by or on behalf of a financial institution ("FI") that issues payment accounts to individual users. For example, the payment account issuer server computer 112 may perform such functions as (a) receiving and responding to requests for authorization of payment account transactions to be charged to payment accounts issued by the FI; and (b) tracking and storing transactions and maintaining account records.

The components of the system 100 as depicted in FIG. 1 are only those that are needed for processing a single transaction. A typical payment system may process many purchase transactions (including simultaneous transactions) and may include a considerable number of payment account issuers and their computers, a considerable number of acquirers and their computers, and numerous merchants and their POS terminals and associated reader components. The system may also include a very large number of payment account holders, who carry payment devices for initiating payment transactions by presenting a payment account number to the reader component of a POS terminal.

Figure 2:
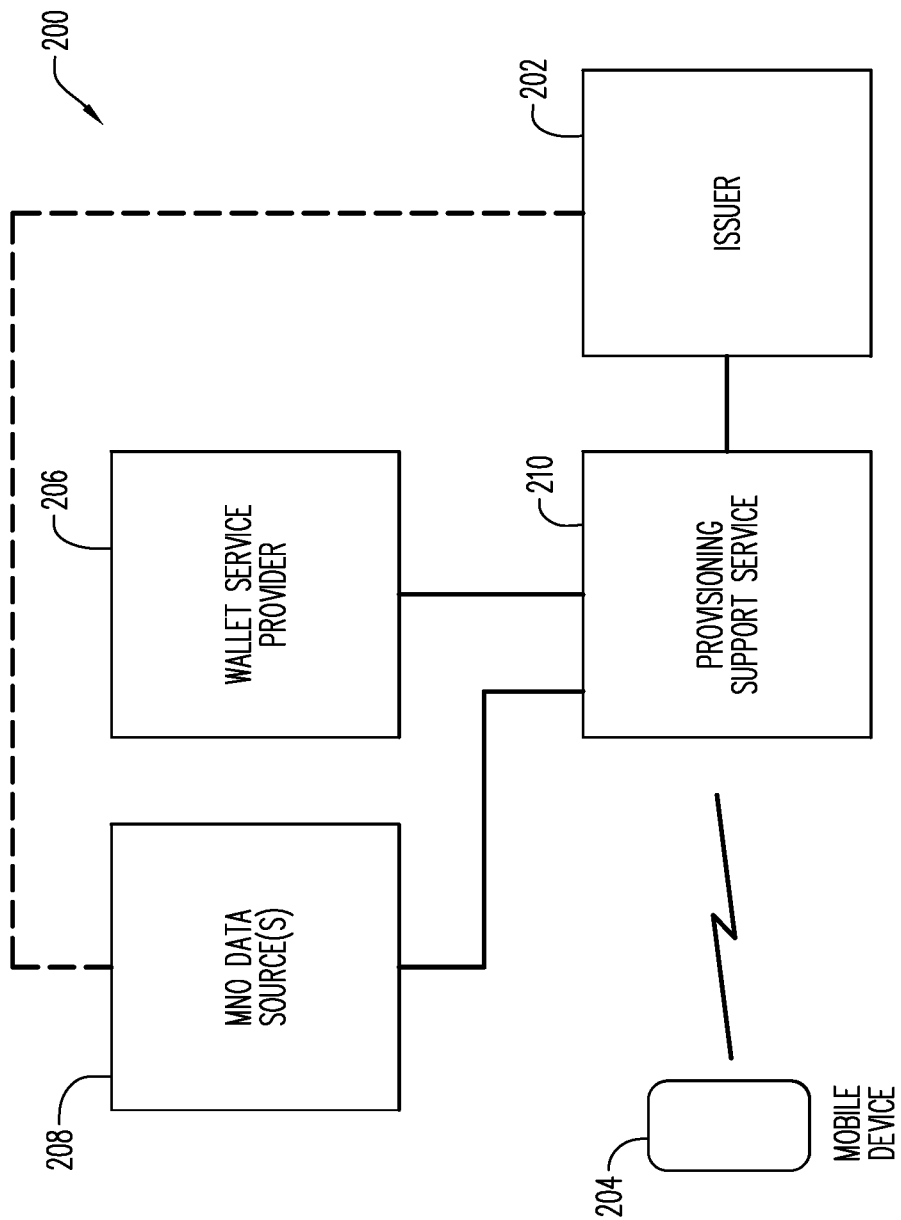
FIG. 2 is a block diagram representation of a system provided in accordance with aspects of the present invention.

FIG. 2 is a block diagram representation of a system 200 provided in accordance with aspects of the present invention. A main purpose of the system 200 may be to perform provisioning of payment credentials to smartphones or other mobile devices that are to be used as payment devices in the sort of payment system depicted in FIG. 1.

Block 202 in FIG. 2 represents an account issuer (typically, a financial institution), which issued a payment account for which payment credentials are requested to be provisioned to an account holder's mobile device 204. (The element 202 shown in FIG. 2 may be under common operation with the element 112 shown in FIG. 1. The device 204 shown in FIG. 2 may be an example of the type of payment device 102 that is shown in FIG. 1.) In some situations, the request for provisioning may come from a wallet service provider (WSP) 206 and may be received at the provisioning support service 210 discussed below. The WSP 206 may have the account holder's account information and/or at least a portion of the payment credentials for the account on file to facilitate, e.g., online purchases by the account holder. In some situations, the WSP may be affiliated with the manufacturer/distributor of the mobile device 204 and/or the publisher/distributor of the operating system used in the mobile device 204 and/or the MNO that provides service to the mobile device 204.

The system 200 may also include one or more sources (block 208) of MNO information. The MNO information may be generated and/or gathered and/or stored by MNOs, including the MNO which provides mobile telecommunication services to the mobile device 204 for which payment credential provisioning is requested. In addition or alternatively, at least some of the MNO information may be generated and/or gathered by other entities (i.e., non-MNOs) that may have relationships with one or more MNOs. Examples of various categories of MNO information are described below.

In some embodiments, the system 200 may also include a provisioning support service (block 210) that may aid or stand in for the issuer 202 in connection with provisioning of payment credentials to mobile devices. Sometimes the provisioning process is referred to as "digitizing" the payment account into the mobile device. One proposed provisioning support service is affiliated with MasterCard International Incorporated (the assignee hereof) and has been referred to as "MDES" (MasterCard Digital Enablement Service).

In accordance with aspects of the present invention, either or both of the provisioning support service 210 and the issuer 202 may be supplied with MNO information related to mobile devices for which payment credential provisioning requests are received. In some embodiments, the requests for provisioning may come from the WSP 206 to the issuer 202.

It should be understood that each block shown in FIG. 2 represents not only an entity/system participant, but also represents a respective computing device operated by the respective entity/system participant.

Figure 3:
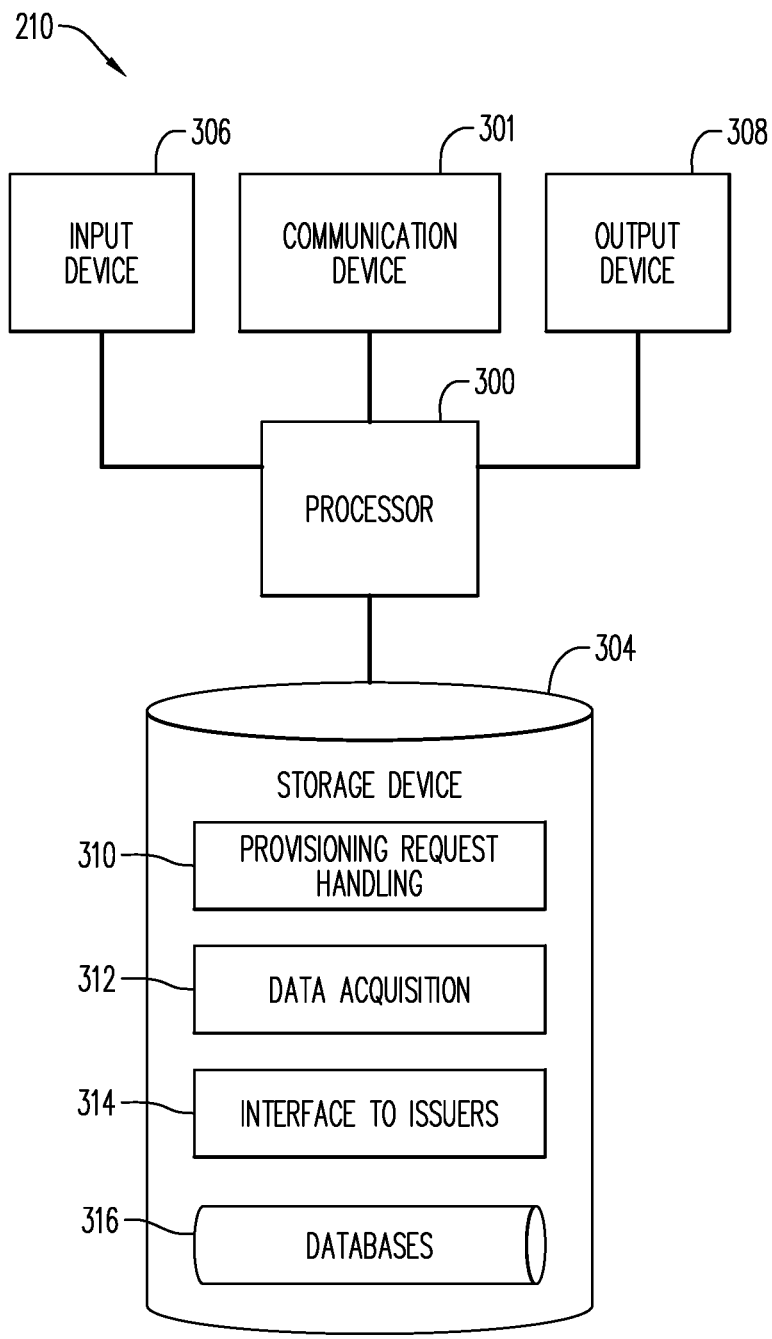
FIG. 3 is a block diagram of a computer system that may provide part of the functionality of the system of FIG. 2 in accordance with aspects of the present invention.

FIG. 3 is a block diagram that illustrates a computer system that may, for example, at least partially embody a computer system operated by or on behalf of the provisioning support service 210. Accordingly, the computer system depicted in FIG. 3 will be referred to as computer system 210.

Referring, then, to FIG. 3, the computer system 210 may be constituted by server computer and/or mainframe computer hardware.

The computer system 210 may include a computer processor 300 operatively coupled to a communication device 301, a storage device 304, an input device 306 and an output device 208.

The computer processor 300 may be constituted by one or more processors. Processor 300 operates to execute processor-executable steps, contained in program instructions described below, so as to control the computer system 210 to provide desired functionality.

Communication device 301 may be used to facilitate communication with, for example, other devices (such as numerous mobile devices and/or a considerable number of issuers and/or other components of the system shown in FIG. 2). For example communication device 301 may comprise numerous communication ports (not separately shown), to allow the computer system 210 to communicate simultaneously with a number of other devices and computers, including communications as required to receive and assist with and/or handle numerous provisioning requests.

Input device 306 may comprise one or more of any type of peripheral device typically used to input data into a computer. For example, the input device 306 may include a keyboard and a mouse. Output device 308 may comprise, for example, a display and/or a printer.

Storage device 304 may comprise any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium or a memory.

Storage device 304 stores one or more programs for controlling processor 300. The programs comprise program instructions (which may be referred to as computer readable program code means) that contain processor-executable process steps of the computer system 210, executed by the processor 300 to cause the computer system 210 to function as described herein. The functionality provided via the programs may include performing some of the process stages described below in connection with FIGS. 5-12.

The programs stored by the storage device 304 may include one or more operating systems (not shown) that control the processor 300 so as to manage and coordinate activities and sharing of resources in the computer system 210, and to serve as a host for application programs that run on the computer system 210.

The storage device 304 may, for example, store a provisioning request handling application program 310. The provisioning request handling application program 310 may include instructions that program the processor 300 such that the computer system 210 is enabled to handle payment credential provisioning requests in one or more of the manners described below.

Further, the storage device 304 may store a data acquisition application program 312. The data acquisition application program 312 may include instructions that program the processor 300 such that the computer system 210 is enabled to obtain data from a source of MNO data, as described further below. In some embodiments, the application programs 310 and 312 may be integrated with each other.

In addition, the storage device 304 may store a software interface 314 for functionally interfacing the computer system 210 with computers operated by issuers of payment accounts (e.g., with the issuer computer represented by block 202 in FIG. 2).

The storage device 304 may further store database management programs and a reporting application (both not separately shown), the latter of which may respond to requests from system administrators for reports on the activities performed by the computer system 210; the storage device 304 may also store communication software, device drivers, etc.

The storage device 304 may also store one or more databases 316 required for operation of the computer system 210.

Figure 4:
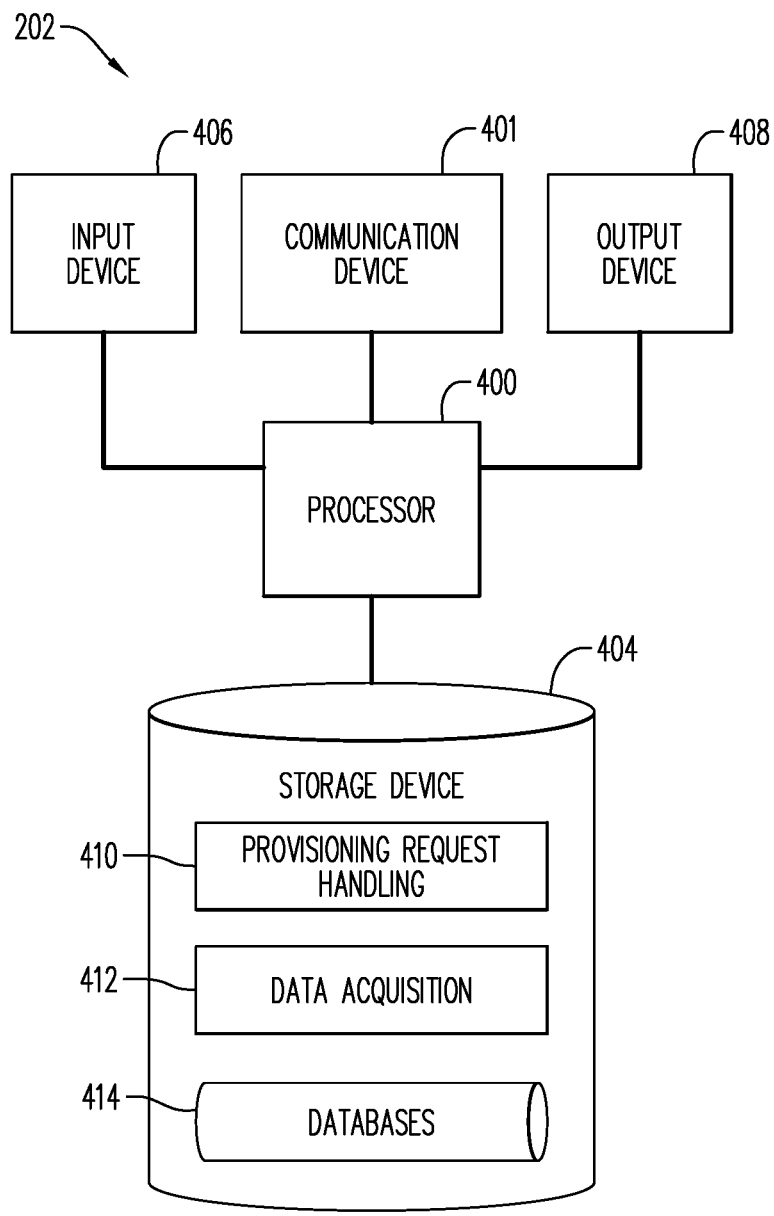
FIG. 4 is a block diagram of another computer system that may provide part of the functionality of the system of FIG. 2 in accordance with aspects of the present invention.

FIG. 4 is a block diagram that illustrates a computer system that may, for example, at least partially embody a computer system operated by or on behalf of the payment account issuer represented by block 202 in FIG. 2. Accordingly, the computer system depicted in FIG. 4 will be referred to as computer system 202.

The computer system 202 may resemble the computer system 210 in terms of hardware architecture. More specifically, the computer system 202 may include a processor 400, a communication device 401, a storage device 404, an input device 406 and an output device 408. These components of computer system 202 may, in their hardware aspects, resemble the like-named components described above in connection with FIG. 3. Processor 400 may operate to execute processor-executable steps, contained in program instructions described below, so as to control the computer system 202 to provide desired functionality.

Like the components of the computer system 210, the some or all of the components of the computer system 202 may be in communication with each other.

Storage device 404 stores one or more programs for controlling processor 400. The programs comprise program instructions (which may be referred to as computer readable program code means) that contain processor-executable process steps of the computer system 202, executed by the processor 400 to cause the computer system 202 to function as described herein. The functionality provided via the programs may include performing some of the process stages described below in connection with FIGS. 5-12.

The programs stored by the storage device 404 may include one or more operating systems (not shown) that control the processor 400 so as to manage and coordinate activities and sharing of resources in the computer system 202, and to serve as a host for application programs that run on the computer system 202.

The storage device 404 may, for example, store a provisioning request handling application program 410. The provisioning request handling application program 410 may include instructions that program the processor 400 such that the computer system 202 is enabled to handle payment credential provisioning requests in one or more of the manners described below.

Further, the storage device 404 may store a data acquisition application program 412. The data acquisition application program 412 may include instructions that program the processor 400 such that the computer system 202 is enabled to obtain data from a source of MNO data, as described further below. In some embodiments, the application programs 410 and 412 may be integrated with each other. In some embodiments, the computer system 202 may not obtain MNO data directly from an MNO or MNO data provider, but rather may obtain such data via communications with the computer system 210.

The storage device 404 may further store database management programs and a reporting application (both not separately shown), the latter of which may respond to requests from system administrators for reports on the activities performed by the computer system 202; the storage device 404 may also store communication software, device drivers, etc.

The storage device 404 may also store one or more databases 414 required for operation of the computer system 202.

Figure 5:
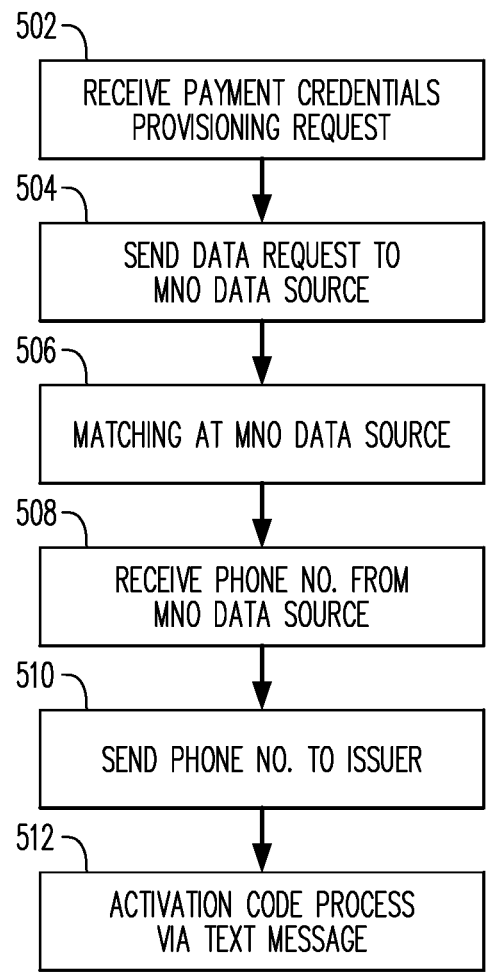
FIGS. 5-12 are flow charts that illustrate examples of processes that may be performed in the system of FIG. 2 in accordance with aspects of the present invention.

FIG. 5 is a flow chart that illustrates an example process/use-case that may be implemented in some embodiments of the system 200 of FIG. 2.

At 502 in FIG. 5, a request is received in the system 200. The request may seek that payment credentials be provisioned to the mobile device 204 shown in FIG. 2. (As used herein and in the appended claims, the term "provisioning credentials to a mobile device" refers to any one or more of (a) downloading the payment credentials for storage on a mobile device; (b) storing the payment credentials on a server computer such that the payment credentials are accessible for use in a point of sale transaction initiated by the mobile device—e.g. via a local or remote digital wallet; and (c) storing—in a server computer—the payment credentials in an original or tokenized form for use in a remote payment transaction performed using the mobile device, e.g., by accessing a remote digital wallet.) In some embodiments the request may be transmitted from the WSP 206 shown in FIG. 2 to the provisioning support service 210 (i.e., to the computer system 210 shown in FIG. 3). The request may be received by the computer system 210. The request may be related to a particular set of payment credentials (e.g., to a particular payment account, such as a payment account for which data is held in a data partition assigned to the user of the mobile device 204 and maintained for the user in the WSP 206). The request may contain the name and home address of the user/account holder as reflected in the records of the WSP 206.

At 504 in FIG. 5, the computer system 210 may send a request for data to the MNO data source(s) 208 shown in FIG. 2. The request sent at 504 may include the account holder name and address as received at step 502. In addition or alternatively, the request may include the primary account number (PAN) for the relevant payment account, and/or the account holder's email address and/or other customer information.

At 506 in FIG. 5, the MNO data source(s) 208 may use the data sent at 504 to look for a matching MNO user account/data record in data generated, stored and/or compiled by an MNO that is associated with the mobile device 204. For purposes of this example process it is assumed that the MNO data source(s) is/are successful in matching to such a data record/account.

At 508 in FIG. 5, the MNO data source(s) 208 send(s) to the computer system 210, and the computer system 210 receives, one or more items of MNO data that were found by the MNO as matching the account holder/user specified in the request made at 504. The term "MNO data" should be understood to refer to one or more items of data generated/ stored and/or compiled by the MNO associated with the mobile device 204. The MNO data items sent and received in connection with this step 508 may include one or more of the following:

MNO Subscriber details
First name, Last name
Street address
City
State
Zip
E-mail address
PAN
Mobile phone number
MNO Account Data
Service plan (post-paid, prepaid)
Account status
Primary account indicator
Account registration
Account change date
MNO Device Data
Device ID (ESN, MEID, IMEI)
Device vendor
Device model
IP address
Device Location
Last device change
Device lost/stolen In addition to and/or instead of the items or potential items of MNO data listed above, the MNO data transferred at 508 may include one or more of the following:

an indication of new portability of the mobile device (i.e., an indication that a new SIM card or device has been associated with the MNO user account).

an indication of the type of device in question.

an indication of the name and/or version of the operating system (OS) running on the device in question.

the serial number of the device in question.

However, in a particular embodiment illustrated in FIG. 5, it may be the case that only one item of the above information is sent to the computer system 210 from the MNO data source(s) 208, namely the mobile phone number associated with the mobile device 204. In one or more alternative embodiments, the MNO data source(s) 208 may send—to the computer system 210—the user's e-mail address in addition to or instead of sending the mobile phone number.

At block 510 in FIG. 5, the computer system 210 may send on, to the computer system 202 (i.e., to the account issuer), either or both of the mobile phone number and/or the user e-mail address that the computer system 210 received at 508.

At 512 in FIG. 5, the computer system 202 may send—to the user/account holder—an activation code relevant to the pending payment credentials provisioning request. This may be done using the mobile phone number and/or e-mail address received at 510 as address data for a message to the user that contains the activation code. This may be done by either or both of e-mail messaging and text messaging (e.g., via SMS messaging). This may result in a resolution of the request, in that the user may send the activation code back to the computer system 202 (i.e., to the account issuer) thereby effecting what may be a highly reliable verification of the user's identity and the validity of the pending request for provisioning payment credentials to the mobile device 204. The computer system 202 may then authorize the computer system 210 to proceed with fulfilling the provisioning request. The computer system 202 may do so with a high degree of confidence in response to the receipt of the activation code, and any other or further ID&V processing may be obviated or short-circuited.

Figure 6:
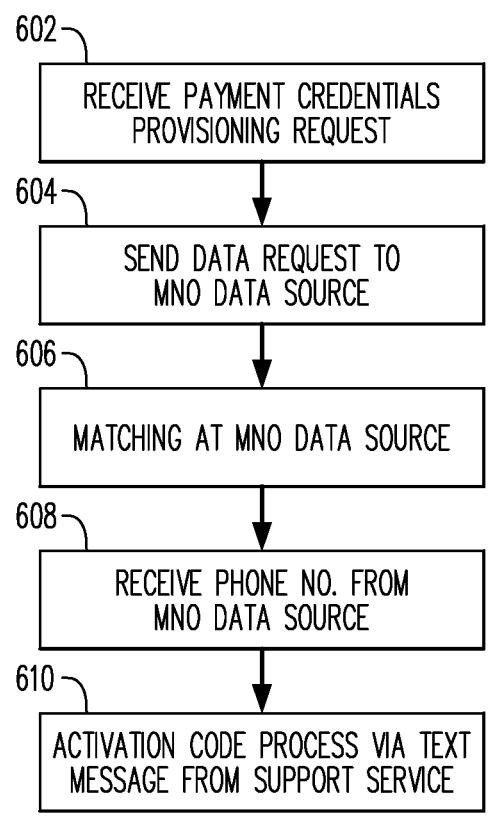

FIG. 6 is a flow chart that illustrates another example process/use-case that may be implemented in some embodiments of the system 200 of FIG. 2.

FIG. 6 shows process steps 602, 604, 606, which may respectively be performed in accordance with the above description of blocks 502, 504 and 506 of FIG. 5.

In addition, FIG. 6 shows a process step 608, which may be the same as the process step 508 referred to above in connection with FIG. 5. In one embodiment of process step 608, the only item of MNO data received by the computer system 210 may be the mobile phone number associated with the mobile device 204. In one or more alternative embodiments of process step, the computer system 210 may in addition or alternatively receive an e-mail address for the user of the mobile device 204.

FIG. 6 also shows a process step 610. Process step 610 may resemble process step 512 of FIG. 5, with the variation that in process step 610, the computer system 210 (i.e., the provisioning support service) may take most or all of the actions attributed to the computer system 202 (i.e., the account issuer) in connection with the discussion of process step 512 of FIG. 5. Thus, in process step 610, the computer system 210 may send an activation code to the user (e.g., via e-mail messaging and/or text messaging) and may receive back the activation code from the user, thereby leading the computer system 210 to proceed with fulfilling the provisioning request. The computer system 210 may do so, e.g., as a fulfillment of an "OBO" (on behalf of) role relative to the account issuer, or as a service for an account issuer that may otherwise commonly engage in online service provision to its account holders.

Figure 7:
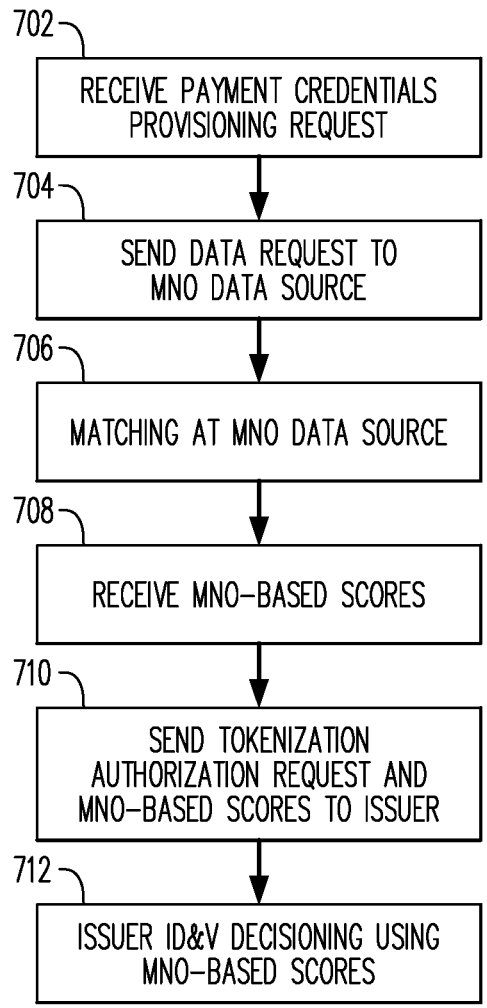

FIG. 7 is a flow chart that illustrates yet another example process/use-case that may be implemented in some embodiments of the system 200 of FIG. 2.

FIG. 7 shows process steps 702, 704, 706, which may respectively be performed in accordance with the above description of blocks 502, 504 and 506 of FIG. 5.

At 708 in FIG. 7, the MNO data source(s) 208 may send—to the computer system 210—one or more scores that have been derived from one or more of the types of MNO data that were listed/described above. It is to be understood that these scores may relate to the user/MNO account as identified by the MNO data source(s) 208 at step 706; i.e., relevant to the mobile device 204. These scores may include one or both of an account score and a device score. Both scores may be expressed as an integer value in the range of 1-to-5, inclusive. A score of "3" may imply a neutral view of the account or device in terms of its reliability/validity. A score of "1" may imply a lack of confidence in the device or account. A score of "5" may imply a high degree of confidence in the device or account. These scores may themselves be viewed as examples of "MNO data". In one example, an MNO account score of "1" may be assigned to an account that is a prepaid account and that has only been in existence for seven days or less. In another example, a score of "5" may be assigned to an account that is post-paid and has been in existence for more than 12 months with no change in status (i.e., no change from active to inactive or vice versa). Those who are skilled in the art will understand how to devise and/or adapt algorithms for generating MNO account and/or device scores based on one or more of the types of MNO data listed/described above. These algorithms may, for example, have similarities to algorithms employed by WSPs to assign scores to user devices and/or WSP user accounts. It will be appreciated that WSP device and/or account scores may be based on data generated, collected and/or stored by a WSP, whereas MNO account and device scores may be based on MNO data. An MNO may lack some or all of the data available to a WSP concerning a given user or device, whereas a WSP may lack some or all of the MNO data referred to above.

In some embodiments, the MNO account and/or device score may be in another format in addition to or instead of the above-mentioned 1-to-5 scale.

At block 710 in FIG. 7, the computer system 210 may send on, to the computer system 202 (i.e., to the account issuer), either or both of the MNO account score and the MNO device score received by the computer system 210 at step 708. The computer system may send the MNO device and account scores to the computer system 202 as part of a message or series of messages submitted from the computer system 210 to the computer system 202. In some embodiments, this messaging may be via a suitable API (application program interface) or another interface. In addition or alternatively, the messaging may include a TAR (tokenization authorization request). The term "TAR" is familiar to those who are skilled in the art, and refers to the provisioning support service requesting the account issuer's authorization for the provisioning support service to fulfill a payment credential provisioning request.

At block 712, the computer system 202 performs decision-making with respect to one or more ID&V processes/process branches/process steps and/or process outcomes based at least in part on the MNO account and/or device scores received by the computer system 210 at 710. In some embodiments, the computer system 202 may use the MNO account and/or device scores to supplement or replace the types of uses that have heretofore been made of WSP device and/or account scores in that type of decision-making. Based at least in part on the MNO device and/or account score, the computer system 202 may determine that a particular ID&V process/process branch and/or process step is or is not required or that one or more outcomes or conclusions should be reached in regard to ID&V in connection with the pending provisioning request.

The availability of MNO scores to the computer system 202 in connection with ID&V decision-making may improve the accuracy and/or efficiency of the ID&V decision-making process. At least some sources of MNO data may find it preferable to provide device and/or account scores rather than raw MNO data.

Figure 8:
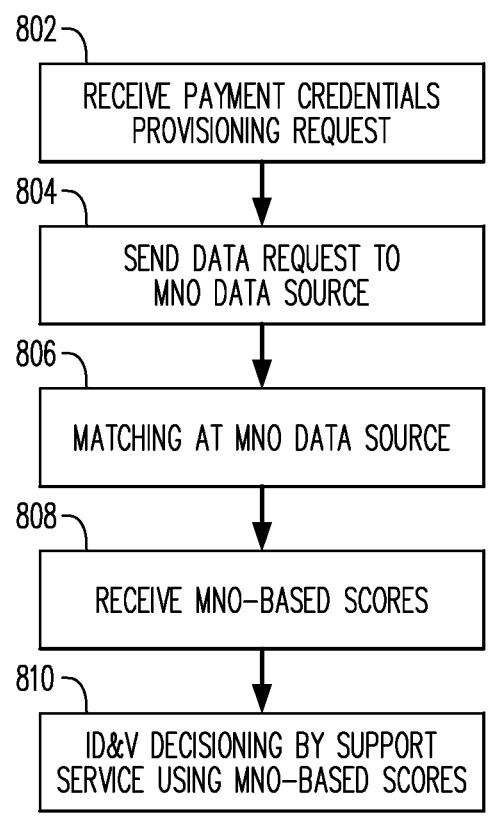

FIG. 8 is a flow chart that illustrates still another example process/use-case that may be implemented in some embodiments of the system 200 of FIG. 2.

FIG. 8 shows process steps 802, 804, 806, 808 which may respectively be performed in accordance with the above description of blocks 702, 704, 706 and 708 of FIG. 7.

FIG. 8 also shows a process step 810. Process step 810 may resemble process step 712 of FIG. 7, with the variation that in process step 810, the computer system 210 (i.e., the provisioning support service) may take most or all of the actions attributed to the computer system 202 (i.e., the account issuer) in connection with the discussion of process step 712 of FIG. 7. Thus, in process step 810, the computer system 210 may utilize the MNO account and/or device scores received at 808 as an input or inputs to ID&V decision-making that the computer system 210 may perform on an OBO basis for the account issuer.

Figure 9:
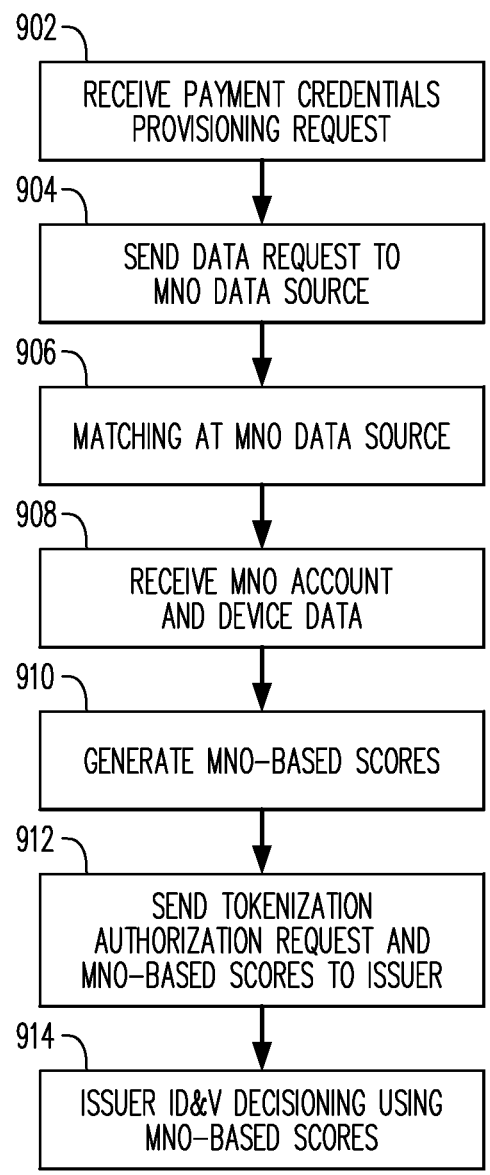

FIG. 9 is a flow chart that illustrates an additional example process/use-case that may be implemented in some embodiments of the system 200 of FIG. 2.

FIG. 9 shows process steps 902, 904, 906, which may respectively be performed in accordance with the above description of blocks 502, 504 and 506 of FIG. 5.

Block 908 in FIG. 9 may broadly resemble block 508 of FIG. 5, in that—at block 908—the computer system 210 may receive—from the MNO data source(s)—the entirety of the types of MNO data listed/described above in connection with block 508, or any useful or potentially useful subset of those types of data.

At block 910 in FIG. 9, the computer system 210 may use/analyze the MNO data received at 908 to generate an MNO account score and/or an MNO device score of the kind or kinds discussed above in connection with block 708 of FIG. 7. Reference is made at this point to the above discussion of block 708.

FIG. 9 further shows process steps 912 and 914, which may respectively be performed in accordance with the above description of blocks 710 and 712 of FIG. 7.

Figure 10:
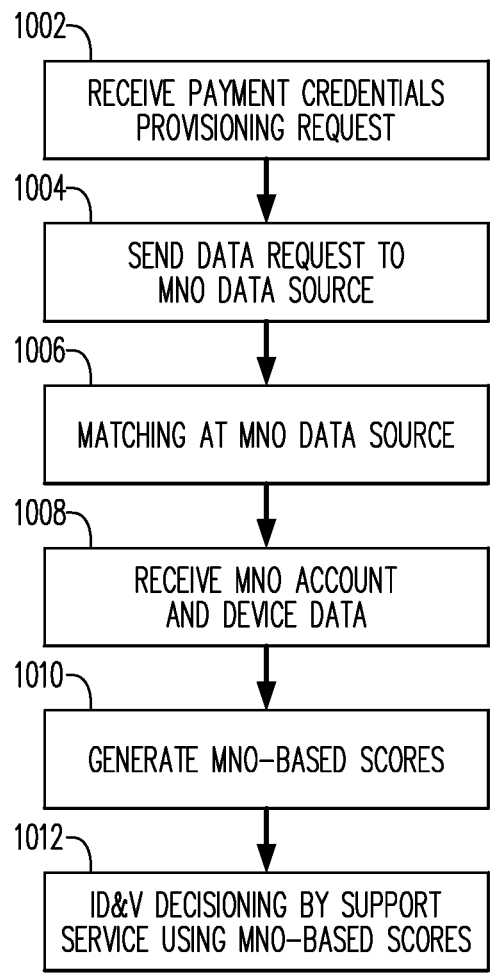

FIG. 10 is a flow chart that illustrates still another example process/use-case that may be implemented in some embodiments of the system 200 of FIG. 2.

FIG. 10 shows process steps 1002, 1004, 1006, 1008, which may respectively be performed in accordance with the above description of blocks 902, 904, 906, 908 of FIG. 9. Process step 1010 shown in FIG. 10 may resemble process step 810 discussed above in connection with FIG. 8. Thus, in process step 1010, the computer system 210 may utilize the MNO account and/or device scores generated at block 1008 as an input or inputs to ID&V decision-making that the computer system 210 may perform on an OBO basis for the account issuer.

Figure 11:
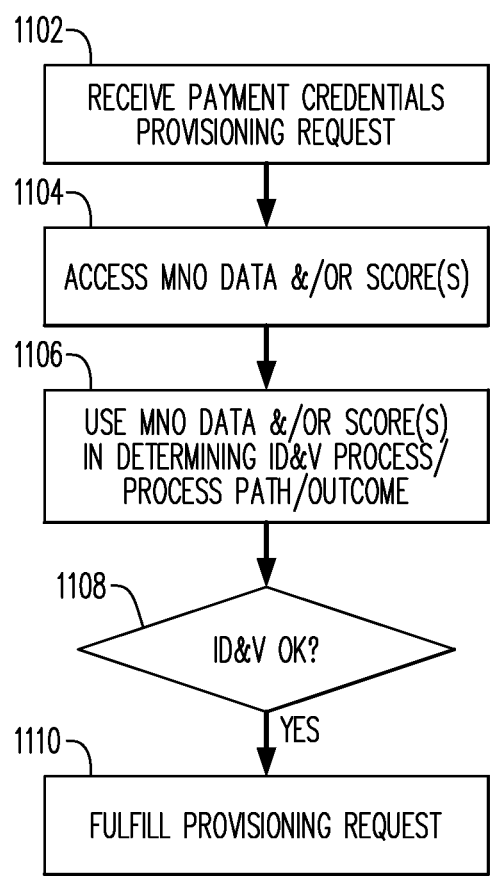

FIG. 11 is a flow chart that may be considered a summary illustration of the use-cases illustrated in FIGS. 5-10 and/or of other use-cases/processes that may be performed in some embodiments of the system 200 of FIG. 2. The process as shown in FIG. 11 may involve cooperation among system components shown in FIG. 2, including the computer systems 210 and 202 and the MNO data source(s) 208.

At 1102 in FIG. 11, the computer system 210 or 202 receives a request to provision payment credentials to the mobile device 204. In some cases the requested provisioning may involve downloading the payment credentials for storage in the mobile device 204. Alternatively, the provisioning request may contemplate that a trusted execution environment (TEE; not separately shown) running in the mobile device 204 is to be enabled to access payment credentials remotely hosted "in the cloud" for use in payment account transactions to be initiated by the mobile device 204.

At 1104, the computer system 210 or 202 may access, receive and or process MNO data relevant to the mobile device 104 and made available to the computer system 210 or 202 by the MNO data source(s) 208 or by another component of the system 200. Various types and/or categories of MNO data, including MNO account and/or device scores, have been mentioned above, including the above discussion of block 508, to which reference is now made.

At 1106, the computer system 210 or 202 may utilize the MNO data in connection with one or more of: (a) determining an outcome of ID&V for the user of the mobile device 102; (b) determining whether or not an ID&V process is required; (c) selecting one or more process branches to be followed in an ID&V process; (d) selecting among one or more different ID&V processes. Block 1106 should also be understood to include some or all of the processing referred to, for example, in connection with blocks 712 (FIG. 7) and/or block 810 (FIG. 8) as discussed above.

At block 1108, the computer system 210 or 202 may make a determination as to whether ID&V has been successfully completed for the account holder and/or that ID&V processing is not required. If a positive determination is made at 1108 (i.e., if ID&V is either not needed or is completed successfully) then block 1110 may follow decision block 1108.

At block 1110, the computer system 210 or 202 proceeds to implement the requested provisioning of payment credentials to the mobile device 204. In some embodiments, ID&V decision-making may occur at computer system 202, which may then instruct/authorize computer system 210 to fulfill the provisioning request.

In example embodiments/use-cases described above, MNO data such as a user's mobile phone number and/or e-mail address was supplied to the provisioning support service and/or to the account issuer. This type of data may serve as an address for messaging to the user, and may supplement existing, but possibly incorrect user address information that is already in the possession of the provisioning support service and/or account issuer. In other cases, the MNO data that provides a user address or addresses for electronic messaging may make up for the lack of such information in the records of the provisioning support service and/or account issuer. With the MNO data that provides the user's address(es) for messaging, an activation code may be sent electronically to the user, in the hope that the user will reply to the provisioning support service or the account issuer with the activation code so as to provide a resolution to the provisioning request with a high degree of confidence that the request is legitimate. In such a case, it may be possible to dispense with time- and resource-consuming ID&V processes in attempting to resolve the provisioning request, while making it unnecessary for the user to contact a call center operated by the account issuer or provisioning support service.

In some embodiments, including some described above, the provisioning support service obtains MNO data and forwards such data to the account issuer to facilitate resolution of provisioning requests. In other embodiments, the account issuer may receive MNO data directly from the MNO data source(s), although not necessarily directly from the MNO itself. In some embodiments, an API (application program interface) or other mechanism may be provided to facilitate exchange of information between the account issuer and/or the provisioning support service on one hand, and the MNO data source(s) on the other hand. In some embodiments, one or more of the MNO data source(s) may be the MNO itself. There are, however, organizations that have relationships with MNOs for the purpose of receiving and commercializing distribution of data generated by or originating from MNOs. In some embodiments, one or more of such intermediary organizations may be some or all of the MNO data source(s). As suggested in prior discussion, in some embodiments, the intermediary organizations and/or the MNOs may derive scores or other summary data from MNO data and provide such scores/summary data to the provisioning support service and/or to the account issuer. In some embodiments, it may be convenient for account issuers if they can rely on the provisioning support service to engage in any necessary arrangements with MNO data source(s) to obtain access to MNO data.

In embodiments described above, the provisioning support service was described as obtaining MNO data in real time in response to a particular provisioning request for which the MNO data was potentially relevant. However, in other embodiments, the provisioning support service (or the account issuer, as the case may be) may obtain MNO data from the MNO data source(s) on a batch basis, for subsequent use when needed, and potentially in the same types of ways as have been described above. Moreover, batches of MNO data may be analyzed by the provisioning support service and/or the account issuer(s) to detect patterns that may lead to insights as to circumstances in which fraud is more likely to occur. These insights may lead to modifications in the way or ways that the provisioning support service and/or the account issuer(s) make decisions about provisioning requests.

In some embodiments, ID&V processes typically used by account issuers may be modified such that one or more items of MNO data may be included as an input or inputs to the ID&V process. For example, if the ID&V process at least partially relies on a rules engine (not shown), the rules engine may be modified to support one or more rules based on MNO account and/or device scores such as those referred to above.

Figure 12:
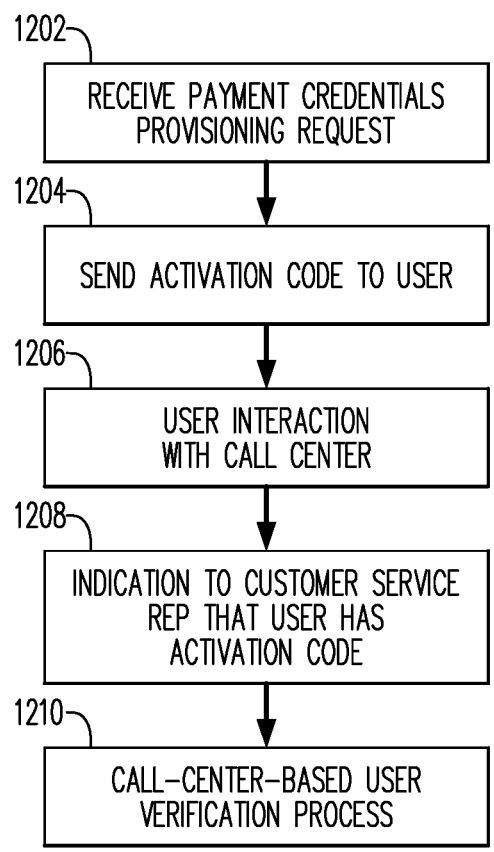

FIG. 12 is a flow chart that illustrates another example process that may be performed in some embodiments of the system 200 of FIG. 2. It will be seen that the process illustrated in FIG. 12 may at least partially overlap with other processes/use-cases that have previously been described.

FIG. 12 shows a block 1202, which may be the same as the process step 502 as described above in FIG. 5 (though in other embodiments, the provisioning request may be received at an account issuer rather than at a provisioning support service).

At block 1204 in FIG. 12, an activation code is sent to the user of the mobile device 204. This may occur, for example, in accordance with a process like one of those described above in connection with FIG. 5 or FIG. 6. Alternatively, the activation code may be sent to the user based on address data that the account issuer had or obtained without use of MNO data.

It is next assumed that the activation code is never received back from the user by the account issuer or the provisioning support service. Instead, as indicated at block 1206, it is assumed that the user contacts a call center operated by or on behalf of the account issuer. The user may do this for the purpose of requesting fulfillment of the provisioning request, with the request for fulfillment to be made orally via telephone with a customer service representative (CSR). It is further assumed that, in connection with this oral request, the CSR accesses one or more data pages relating to the user and/or the pending provisioning request. As indicated at block 1208, the data page(s) accessed by the CSR may provide to the CSR an indication that an activation code has previously been sent to the user. This may prompt the CSR to regard the call/request from the user has having a somewhat elevated risk associated with it, in that it is unclear why the user did not simply send back the activation code in order to obtain fulfillment of the provisioning request. Accordingly, the CSR may undertake a relatively rigorous path or paths through an ID&V process for the caller/user, so as to minimize the risk of fulfilling a fraudulent provisioning request. Block 1210 represents the actions of the CSR and other call-center-related activity in regard to ID&V for the caller/user.

In some embodiments, rather than obtaining previously unavailable data from an MNO data source, the account user or provisioning support service may transmit data that is already available (e.g., a device identification number, a device type or model, an IP address, a mobile phone number, a user e-mail address, or other account or device information, etc.) to an MNO data source for the purpose of confirming that the data is valid. Such a confirmation may be an input to an ID&V process and/or a decision-making process related to ID&V performed by the account issuer and/or the provisioning support service and/or a decision to send an activation code to a given e-mail address or mobile phone number.

In some embodiments, instead of or in addition to using MNO data in connection with decision-making on provisioning requests, other types of information may be employed for those purposes, including, e.g., credit bureau information and/or consumer database information.

As used herein and in the appended claims, "facilitating decision-making" should be understood to include performing or rendering unnecessary one or more steps in a decision-making process and/or gathering or receiving or confirming and/or supplying one or more data inputs used or required for a decision-making process.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

As used herein and in the appended claims, a "server" includes a computer device or system that responds to numerous requests for service from other devices.

The flow charts and descriptions thereof herein should not be understood to prescribe a fixed order of performing the method steps described therein. Rather the method steps may be performed in any order that is practicable, including simultaneous performance of at least some steps.

As used herein and in the appended claims, the term "payment card system account" includes a credit card account, a deposit account that the account holder may access using a debit card, a prepaid card account, or any other type of account from which payment transactions may be consummated. The terms "payment card system account" and "payment card account" and "payment account" are used interchangeably herein. The term "payment card account number" includes a number that identifies a payment card system account or a number carried by a payment card, or a number that is used to route a transaction in a payment system that handles debit card and/or credit card transactions. The term "payment card" includes a credit card, debit card, prepaid card, or other type of payment instrument, whether an actual physical card or virtual.

As used herein and in the appended claims, the term "payment card system" or "payment system" refers to a system for handling purchase transactions and related transactions. An example of such a system is the one operated by MasterCard International Incorporated, the assignee of the present disclosure. In some embodiments, the term "payment card system" may be limited to systems in which member financial institutions issue payment card accounts to individuals, businesses and/or other organizations.

Although the present disclosure has been described in connection with specific exemplary embodiments, it should be understood that various changes, substitutions, and alterations apparent to those skilled in the art can be made to the disclosed embodiments without departing from the spirit and scope of the disclosure as set forth in the appended claim.

What is claimed is:

1. A method of provisioning payment credentials to a mobile device, the method comprising:
  receiving a payment credentials provisioning request; and
  facilitating decision-making with respect to the request based at least in part on data obtained and/or confirmed directly or indirectly from a mobile network operator (MNO) associated with the mobile device;
  wherein said data includes at least one of: (a) an indication that the mobile device has been lost; (b) an indication that the mobile device has been stolen; (c) an indication that a service plan for the mobile device is a pre-paid plan; and (d) an indication that the service plan for the mobile device is a post-paid plan.

2. The method of claim 1, wherein the facilitating step includes selecting a decision process or process path based on said data.

3. The method of claim 1, wherein said facilitating step is performed by an issuer of a payment account to be provisioned to the mobile device.

4. The method of claim 1, wherein said facilitating step includes using said data as an input to a decision-making process.

5. The method of claim 1, wherein:
  said request is for having a PAN (primary account number) or payment token downloaded to the mobile device.

6. The method of claim 1, wherein:
  said request is for allowing the mobile device access, during payment account transactions, to a set of payment credentials hosted in a remote server.

7. The method of claim 1, wherein the mobile device is a smartphone.

8. An apparatus for facilitating provisioning payment credentials to a mobile device, the apparatus comprising:
  a processor; and
  a memory in communication with the processor, the memory storing program instructions, the processor operative with the program instructions to perform functions as follows:
    receiving a payment credentials provisioning request; and
    facilitating decision-making with respect to the request based at least in part on data obtained and/or confirmed directly or indirectly from a mobile network operator (MNO) associated with the mobile device;
    wherein said data includes at least one of: (a) an indication that the mobile device has been lost; (b) an indication that the mobile device has been stolen; (c) an indication that a service plan for the mobile device is a pre-paid plan; and (d) an indication that the service plan for the mobile device is a post-paid plan.

9. The apparatus of claim 8, wherein the facilitating step includes selecting a decision process or process path based on said data.

10. The apparatus of claim 8, wherein said facilitating step is performed by an issuer of a payment account to be provisioned to the mobile device.

11. The apparatus of claim 8, wherein said facilitating step includes using said data as an input to a decision-making process.

12. The apparatus of claim 8, wherein:
  said request is for having a PAN (primary account number) or payment token downloaded to the mobile device.

13. The apparatus of claim 8, wherein:
said request is for allowing the mobile device access, during payment account transactions, to a set of payment credentials hosted in a remote server.

14. The apparatus of claim 8, wherein the mobile device is a smartphone.

15. A non-transitory memory device, the memory device storing program instructions, the program instructions for controlling a processor to perform functions as follows in connection with provisioning payment credentials to a mobile device:
receiving a payment credentials provisioning request; and
facilitating decision-making with respect to the request based at least in part on data obtained and/or confirmed directly or indirectly from a mobile network operator (MNO) associated with the mobile device;
wherein said data includes at least one of: (a) an indication that the mobile device has been lost; (b) an indication that the mobile device has been stolen; (c) an indication that a service plan for the mobile device is a pre-paid plan; and (d) an indication that the service plan for the mobile device is a post-paid plan.

16. The memory device of claim 15, wherein the facilitating step includes selecting a decision process or process path based on said data.

17. The memory device of claim 15, wherein said facilitating step is performed by an issuer of a payment account to be provisioned to the mobile device.

18. The memory device of claim 15, wherein said facilitating step includes using said data as an input to a decision-making process.

19. The memory device of claim 15, wherein:
said request is for having a PAN (primary account number) or payment token downloaded to the mobile device.

20. The memory device of claim 15, wherein:
said request is for allowing the mobile device access, during payment account transactions, to a set of payment credentials hosted in a remote server.

* * * * *